United States Patent
Mosora (10) Patent No.: US 11,089,867 B2
(45) Date of Patent: Aug. 17, 2021

(54) ADJUSTABLE, BODY-SUPPORTED MOBILE DESK

(71) Applicant: Anthony Mosora, Bloomington, IN (US)

(72) Inventor: Anthony Mosora, Bloomington, IN (US)

(73) Assignee: Anthony Mosora, Tampa, FL (US)

( * ) Notice: Subject to any disclaimer, the term of this patent is extended or adjusted under 35 U.S.C. 154(b) by 0 days.

(21) Appl. No.: 16/531,797

(22) Filed: Aug. 5, 2019

(65) Prior Publication Data

US 2020/0037755 A1    Feb. 6, 2020

Related U.S. Application Data

(60) Provisional application No. 62/714,435, filed on Aug. 3, 2018.

(51) Int. Cl.
     *A47B 23/00*      (2006.01)
     *A45F 3/14*      (2006.01)
     *F16M 13/04*      (2006.01)

(52) U.S. Cl.
     CPC ...... *A47B 23/002* (2013.01); *A45F 2003/146* (2013.01); *F16M 13/04* (2013.01)

(58) Field of Classification Search
     CPC ........ F16M 13/04; F16M 13/00; F16M 11/24; F16M 11/10; A47F 5/00; A47F 2200/0525; A47F 3/10; A47F 2003/146; A47B 23/002
     USPC ....... 224/265, 270, 257, 256, 325, 930, 625; 108/43
See application file for complete search history.

(56) References Cited

U.S. PATENT DOCUMENTS

| | | | | |
|---|---|---|---|---|
| 1,191,425 A * | 7/1916 | Huddle | ............... | A47B 23/002 108/43 |
| 1,235,070 A * | 7/1917 | Sleeper | ............... | A47B 23/002 248/444 |
| 2,685,757 A * | 8/1954 | Mirigian | ............... | A47B 23/02 248/444 |
| 2,967,649 A * | 1/1961 | Mack | ...................... | A45F 3/10 224/263 |
| 2,996,830 A * | 8/1961 | Reichmuth | ............ | F16M 13/04 248/444 |
| 4,450,993 A * | 5/1984 | Ephraim | ............... | G10G 5/005 224/265 |
| 4,715,293 A * | 12/1987 | Cobbs | .................. | A47B 23/002 108/43 |
| 5,222,641 A * | 6/1993 | Medeiros, Jr. | ....... | A47D 13/025 224/161 |
| 6,764,231 B1 * | 7/2004 | Shubert | .................. | F16M 13/04 396/419 |
| 6,830,292 B1 * | 12/2004 | Yoda | ..................... | B60N 3/004 108/44 |

(Continued)

*Primary Examiner* — Janet M Wilkens
(74) *Attorney, Agent, or Firm* — IU Maurer School of Law IP Legal Clinic; Norman J. Hedges (57) ABSTRACT

A body supported desk includes a carrier, a platform, and a plurality of hook-shaped support rods coupling the carrier with the platform. The platform further includes a plurality of substantially straight stabilizer bars and a plurality of joints each formed in part by one of the stabilizer bars and a mounting piece structured to receive one of the plurality of support rods. The plurality of joints are structured to permit a user to adjust an angle of the platform relative to the carrier.

12 Claims, 5 Drawing Sheets

(56) References Cited

U.S. PATENT DOCUMENTS

| | | | | |
|---|---|---|---|---|
| 7,394,008 B2* | 7/2008 | May | ............. | G10G 5/005 |
| | | | | 224/265 |
| 7,673,776 B2* | 3/2010 | May | ............. | G10G 5/005 |
| | | | | 224/266 |
| 8,267,294 B2* | 9/2012 | Yu | ............. | F16M 11/24 |
| | | | | 224/623 |
| D697,708 S * | 1/2014 | Denzer | ............. | D3/215 |
| 9,004,330 B2* | 4/2015 | White | ............. | F16M 13/04 |
| | | | | 224/257 |
| 9,761,207 B2* | 9/2017 | Tadano | ............. | A45F 3/10 |
| 10,660,426 B2* | 5/2020 | Norman | ............. | A45F 5/00 |
| 2006/0175365 A1* | 8/2006 | Sandler | ............. | A45F 3/14 |
| | | | | 224/201 |
| 2009/0272779 A1* | 11/2009 | Vu | ............. | A45F 5/00 |
| | | | | 224/677 |
| 2015/0305479 A1* | 10/2015 | Sanchez | ............. | A45F 3/14 |
| | | | | 224/262 |

* cited by examiner

ADJUSTABLE, BODY-SUPPORTED MOBILE DESK

RELATED APPLICATION

This application claims the benefit of U.S. Provisional Application No. 62/714,435 titled "ADJUSTABLE, BODY-SUPPORTED MOBILE DESK" to Anthony Mosora, filed Aug. 3, 2018, the entire disclosures of which is expressly incorporated by reference herein.

TECHNICAL FIELD

The present disclosure relates generally to office equipment and analogous apparatuses, more particularly, to mobile, body-supported desk assemblies.

BACKGROUND

In many contexts, a desktop work surface is a necessary component of an efficient working environment. Of course, desks are not intended to be mobile, instead being positioned in an office, classroom, or similar setting, requiring one to physically remain in a confined area to enjoy the benefit of a flat work surface.

In recent years, it has become apparent that sitting at a desk for hours on end may have negative, and severe, implications on people's short- and long-term health. In response, many solutions have been proposed to increase physical activity at work stations. For example, stationary bikes or treadmills that include a flat work surface have become increasingly common. Also on the rise are stand up desks that allow workers or students to stand up while working, which may mitigate some of the negative health consequences observed in the office and classroom settings. Still, these and other efforts do not permit users to leave the confined area in which their desk is situated. Put differently, productivity and mobility have traditionally been mutually exclusive goals, with productivity typically dominating.

There have been some attempts at creating mobile work stations, however. One such attempt is disclosed in U.S. Pat. No. 4,715,293 to Cobbs ("Cobbs"). Cobbs discloses a body-supported, hand-operated instrument desk that includes a harness that loops over the user's shoulders, a belt that wraps around the user's waist, and a flat work space formed by a woven fabric stretched around a solid frame. While this and other strategies may provide a mobile work surface suitable for use in certain contexts, there remains ample room for improvement and development of alternative strategies.

SUMMARY OF THE INVENTION

In one aspect, a mobile desk includes a body supported carrier that includes a shoulder harness, a torso support member, and a vertical connector body coupling the shoulder harness with the torso support member. The mobile desk further includes a platform and a hook-shaped support rod coupling the carrier with the platform. The platform has a bottom side, a substantially planar top side, a substantially straight stabilizer bar coupled with the bottom side, and a mounting piece coupled with the stabilizer bar to form a joint, wherein the support rod is partially received by the mounting piece. The joint is structured to allow the platform to be adjusted between a horizontal position and an inclined position.

In another aspect, a platform for a mobile desk includes a front side, a back side, a bottom side, and a substantially planar top side. The platform further includes a first stabilizer bar and a second stabilizer bar, a first mounting piece coupled with the first stabilizer bar to form a first joint, and a second mounting piece coupled with the second stabilizer bar to form a second joint. Each of the first and the second stabilizer bars are coupled to the bottom side adjacent to the back side and extend a majority of a length of the platform between the front side and the back side. The first and the second joints are structured to allow the platform to be adjusted between a horizontal position and an inclined position, and further include an angle adjustment handle.

In still another aspect, a mobile desk includes a body supported carrier that includes a shoulder harness, a torso support member, and a vertical connector body coupling the shoulder harness with the torso support member. The mobile desk also includes a platform formed of a rigid, lightweight material, and a plurality of hook-shaped support rods coupling the carrier with the platform, each of the plurality of support rods having a platform mounting section and a carrier mounting section. The platform includes a front side, a back side, a bottom side having a plurality of downward projections, a substantially planar top side, and a plurality of stabilizer bars formed of a rigid, lightweight material. Each of the plurality of stabilizer bars are coupled with the bottom side by way of attachment to the plurality of downward projections, wherein at least two of the plurality of stabilizer bars are positioned adjacent to the back side and parallel with each other.

BRIEF DESCRIPTION OF THE DRAWINGS

The previously described aspects of this disclosure will grow to be appreciated at a greater level once references to the following accompanying illustrations are expounded upon.

The embodiments disclosed below are not intended to be exhaustive or limit the disclosure to the precise form disclosed in the following detailed description. Rather, the embodiments are chosen and described so that others skilled in the art may utilize their teachings. Unless otherwise indicated, the components shown in the figures are shown proportional to each other. It will be understood that no limitation of the scope of the disclosure is thereby intended. The disclosure includes any alterations and further modifications in the illustrative devices and described methods and further applications of the principles of the disclosure which would normally occur to one skilled in the art to which the disclosure relates.

DETAILED DESCRIPTION

Figure 1:
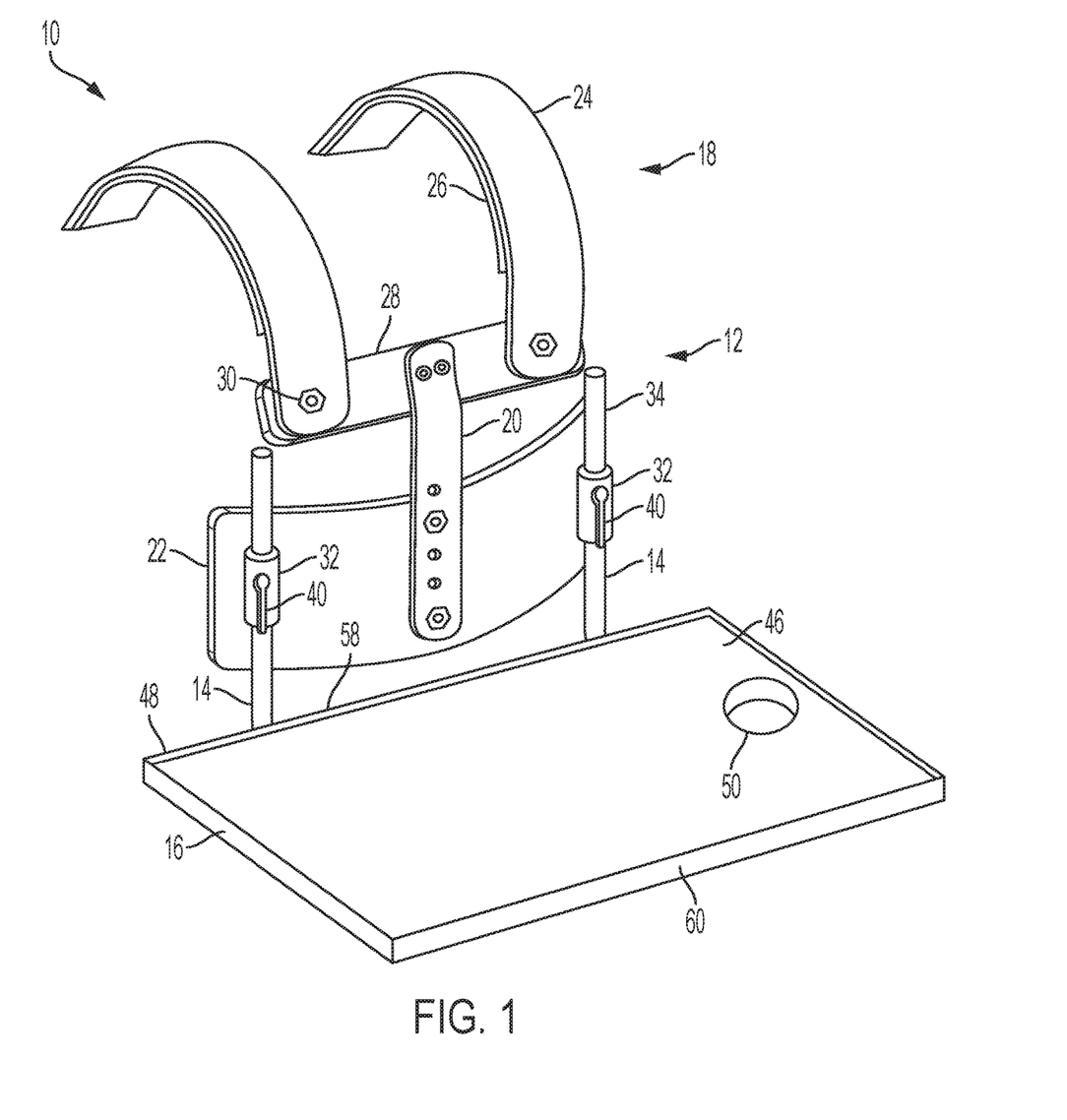
FIG. 1 is a diagrammatic perspective view of a mobile desk, according to one embodiment.

Referring now to FIG. 1, a perspective view of a wearable, body-supported mobile desk ("mobile desk") 10 is shown. Mobile desk 10 includes a carrier ("carrier") 12, one or more support rods 14, and a platform 16. Carrier 12 is structured to fit upon a user (not shown) in a manner that permits the user to carry mobile desk 10 without unduly restricting or encumbering the user's mobility. Support rods 14 connect carrier 12 and platform 16 which provides a table space for the user to rest his/her computer, book, and etc.

As stated above, carrier 12 fits upon the user so that the user can easily carry mobile desk 10. One common way of achieving such purpose is carrier 12 conforming to the shape of the user's shoulder, chest, and torso. Carrier 12 includes a shoulder harness 18, a vertical connector body 20, and a torso support member 22, each of which may be formed substantially of a rigid, lightweight material such as plastic, carbon fiber, or any other suitable material. Shoulder harness 18 includes a pair of curved shoulder straps 24 structured to fit upon and generally conform to the shape of a user's shoulders. Shoulder straps 24 may further include padding 26 attached to an underside of the shoulder straps 24 to increase user comfort and add stability to mobile desk 10 by, for instance, allowing shoulder harness 18 to more closely conform to the user's bust. Shoulder harness 18 may include a horizontal chest piece 28 coupling the pair of curved shoulder straps 24. In one embodiment, as shown in FIG. 1, shoulder straps 24 are attached to chest piece 28 by a fastener assembly 30, which includes a nut, a bolt, and a washer. In other embodiments, not shown in the figures, shoulder straps 24 could be bonded to chest piece 28, or could be attached to chest piece 28 by way of a screw, an adhesive, or any other suitable mechanism or technique. In other embodiments, chest piece 28 may be integrally formed with shoulder straps 24 such that shoulder harness 18 has a unitary construction.

Shoulder harness 18 may be coupled with torso support member 22 by way of vertical connector body 20, which can be attached to each of shoulder harness 18 and torso support member 22 by a fastener assembly 30 or by any other suitable means. According to one embodiment shown in FIG. 1, vertical connector body 20 includes at least one connecting strap with one end fastened on chest piece 28 and the other end fastened on torso support member 22. In other embodiments not shown in the figures, vertical connector body 20 might include one or more connecting straps with one end fasten on shoulder straps 24 and the other end fastened on torso support member 22.

Both vertical connector body 20 and chest piece 28 may have an inside surface that is substantially flat or slightly concave so as to provide a greater amount of surface area contacting the user's torso during use as compared with most known body-supported desks. Put differently, the inner surfaces of the components of carrier 12 are structured to conform with the user's torso. In this way, user comfort and mobility may be increased, as the weight of mobile desk 10, including any objects on platform 16, is distributed across a greater surface area so that loads do not concentrate on certain part of the user's torso. Torso support member 22 is also structured to distribute the weight of mobile desk 10 to increase user comfort. In one aspect, torso support member 22 may be structured to conform with the shape of a user's abdomen. For instance, torso support member 22 might be curved between a right side and a left side of torso support member 22 in the orientation of FIG. 1. In another aspect, torso support member 22 can be sized to maximize surface area to prevent load concentration. By way of example, in some embodiments, torso support member 22 might have a height between a top edge (not numbered) and a bottom edge (not numbered) at least a majority of a distance between chest piece 28 and platform 16. In some embodiments, the inner surfaces of chest piece 28, vertical connector body 20, and torso support member 22 might also have padding attached thereto.

Torso support member 22 may be coupled with vertical connector body 20 such that torso support member 22 can be vertically adjusted relative to shoulder harness 18. In this way, mobile desk 10 can be configured for use by users of different heights. According to the embodiment shown in FIG. 1, multiple bolt holes exist on vertical connector bodies 20 so that the users can adjust the height by putting nuts and bolts on different bolt holes. In other embodiments, vertical connector bodies 20 might have a different mechanism for vertically adjusting torso support member 22, such as a slide track, a hook and latch assembly, or the like.

As stated above, support rods 14 connect carrier 12 and platform 16. In one embodiment shown in FIGS. 1 and 2, torso support member 22 includes at least two clamps 32, each being structured to receive and grip a support rod 14. Each clamp 32 is positioned laterally outward from a midline of torso support member 22 and, more specifically, within a leftmost or a rightmost ⅓ section of torso support member 22. In this way, support rods 14 provide a wider base for supporting platform 16, thereby enhancing the lateral stability of platform 16 during use. In other embodiments, torso support member 22 might include more or fewer clamps 32, or might include a different mechanism for coupling support rods 14 with torso support member 22.

Figure 2:
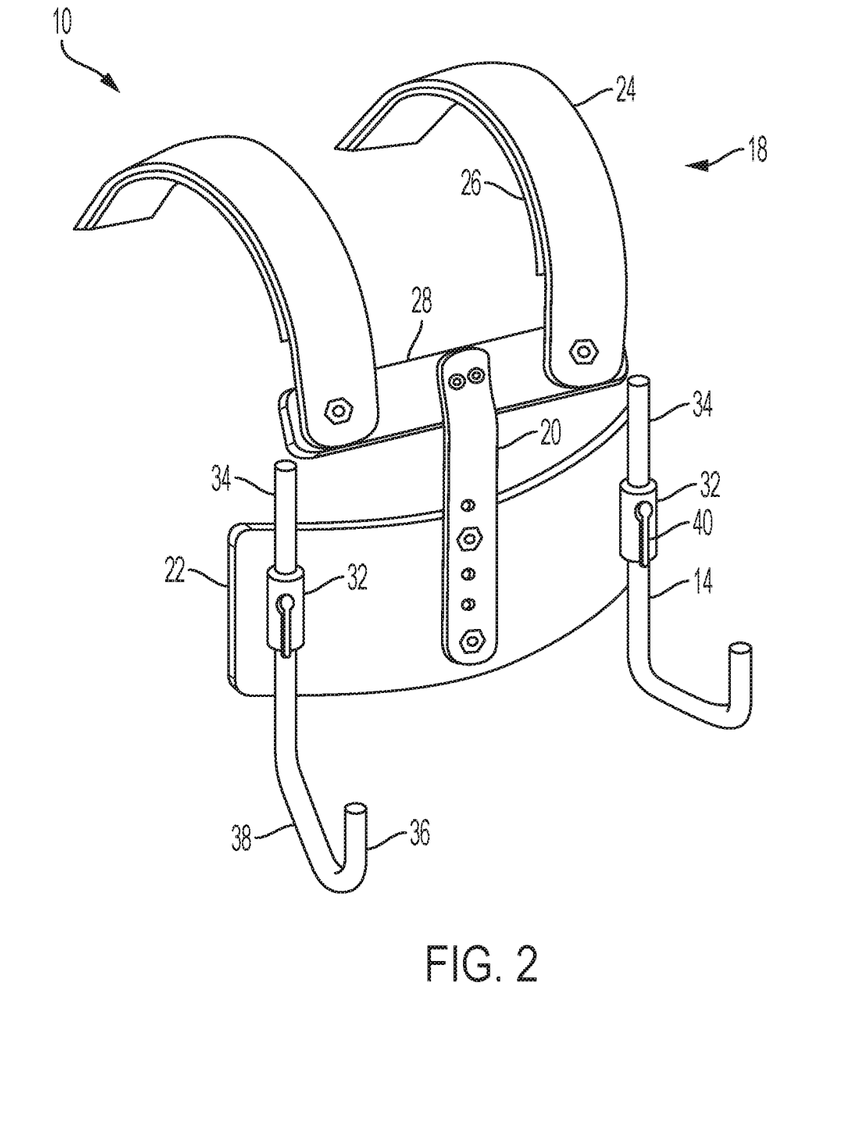
FIG. 2 is a diagrammatic perspective view of a mobile desk with a platform removed, according to one embodiment.
Figure 6:
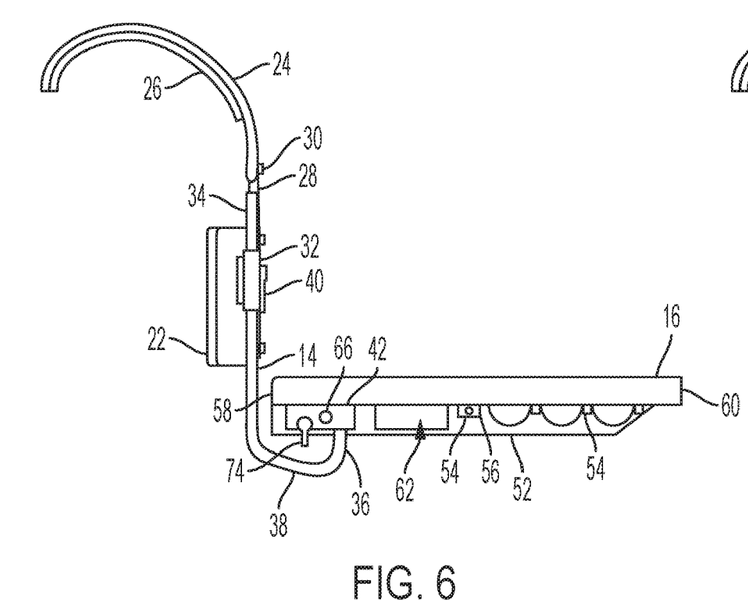
FIG. 6 is a diagrammatic side view of a mobile desk with a platform adjusted to a first position, according to one embodiment.

Referring now also to FIG. 2, mobile desk 10 is shown with platform 16 removed to further illustrate the structure and position of support rods 14. Support rods 14 may have a hook or a J shape (i.e., J-rods or J-bars), with a carrier mounting section 34, a platform mounting section 36, and a transition section 38 extending therebetween. Support rods 14 are coupled with carrier 12 by way of clamps 32 structured to receive carrier mounting section 34. Carrier mounting section 34 is substantially straight such that the clamp 32 may engage support rod 14 at any point therein. In this way, the vertical position of support rods 14, and thus of platform 16, may be adjusted by moving support rods 14 upward or downward relative to clamps 32. Clamps 32 may include a vertical adjustment handle 40 to tighten or loosen the clamps 32 for this purpose. In other embodiments not shown in the figures, clamps 32 and carrier mounting section 34 may form slide track pairs, a hook and latch assembly, or the like to make height adjustable. Platform mounting section 36 is substantially parallel with carrier mounting section 34, and structured to be partially received by a mounting piece 42 (as can be seen in FIG. 6, discussed hereinafter). In some embodiments, carrier mounting section 34 and platform mounting section 36 could be angled relative to each other, however.

Figure 3:
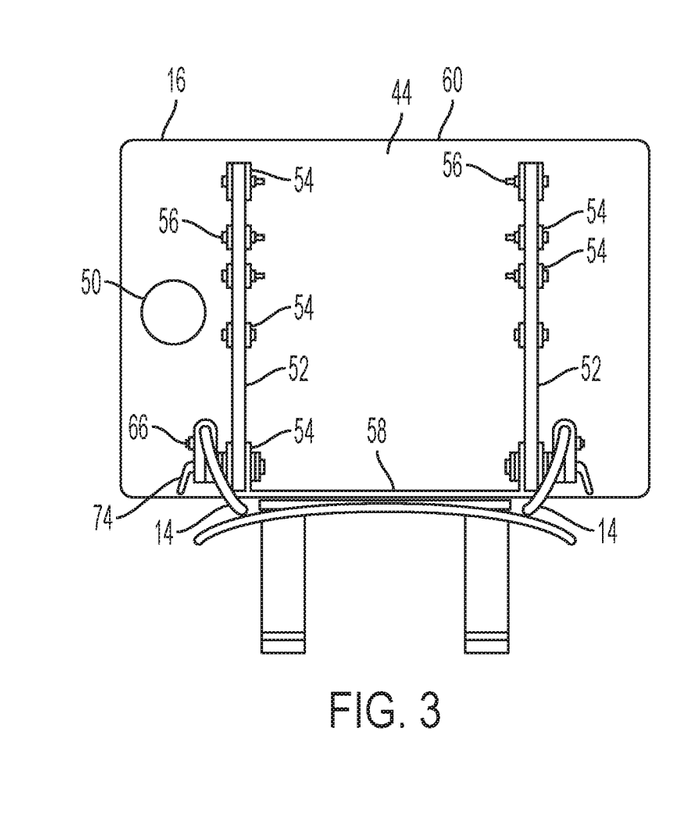
FIG. 3 diagrammatic bottom view of a mobile desk, according to one embodiment.

As stated above, platform 16 provide a working table space for the user. Platform 16 has a polygonal shape with a bottom side 44 (as seen in FIG. 3, discussed hereinafter) and a substantially planar top side 46, although platform 16 might have a circular, oblong, or other shape in some embodiments. A lip 48 may extend around a perimeter of platform 16 at top side 46. Platform 16 might also include a cup holder 50 formed in top side 46 or located elsewhere. Other embodiments of platform 16 may include different or additional components, features, or accessories, such as a USB or other type of port, a raised plateau section or a raised shelf within or positioned on top side 46, an elastic strap to secure books or papers, a notch or other type of book or paper holder, a removable or non-removable placemat formed of a different material than platform 16, a light, a mobile phone or tablet clamp, a power bank, or any other desirable feature, component, or accessory.

Referring now also to FIG. 3, a bottom view of mobile desk 10 is shown. Mobile desk 10 may include a pair of stabilizer bars 52 coupled to platform 16 by way of one or more projections 54 extending from bottom side 44. Stabilizer bars 52 and each projection 54, or set of projections 54, may have apertures (not pictured) that can be aligned to receive a fastener 56, such as a bolt, a screw, a rod, or the like. Stabilizer bars 52 may be substantially straight and parallel to each other, and may extend a majority of a length of platform 16 between a back side 58 and a front side 60.

Figure 7:
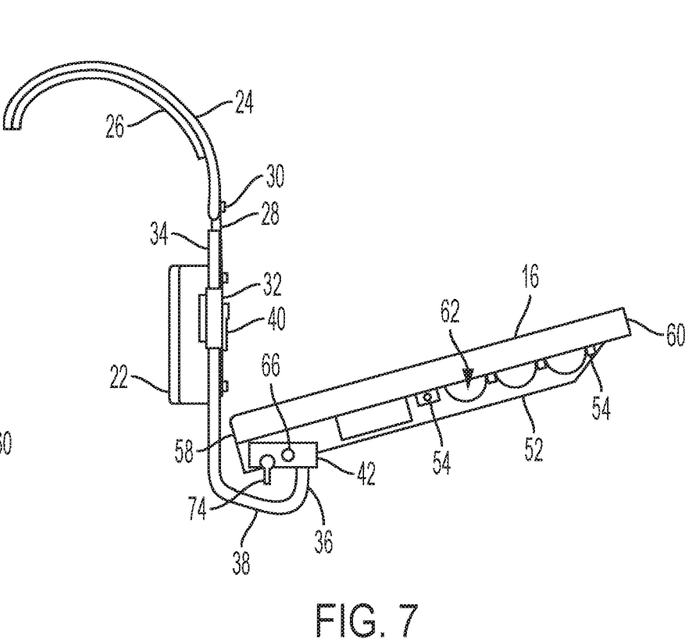
FIG. 7 is a diagrammatic side view of a mobile desk with a platform adjusted to a second position, according to one embodiment.

Stabilizer bars 52 are formed of a rigid lightweight material capable of providing structural rigidity to platform 16 without unduly adding to the overall weight of mobile desk 10 such as, for example, aluminum or an aluminum alloy. In other embodiments, stabilizer bars 52 might be formed of a plastic or carbon fiber material, or of any other suitable metal or non-metal material. As can be seen in FIGS. 6 and 7 (discussed hereinafter), sections of either stabilizer bar 52 can be cut out and removed to create openings 62 (seen in FIGS. 6 and 7) to decrease the weight of the stabilizer bars 52, and thus, mobile desk 10. In some embodiments, mobile desk 10 might include only one stabilizer bar 52, or might include three or more stabilizer bars 52. In other embodiments, stabilizer bars 52 might be longer or shorter, or might be coupled to platform 16 at an angle relative to another stabilizer bar 52. Embodiments in which the structure and/or material composition of platform components, such as stabilizer bars 52, are selected based on an intended use of mobile desk 10 are also contemplated. For example, some embodiments might use sturdier, but heavier, materials where mobile desk 10 may be used to carry heavier items, or might use lighter, less sturdy, materials for other applications or uses.

Figure 4:
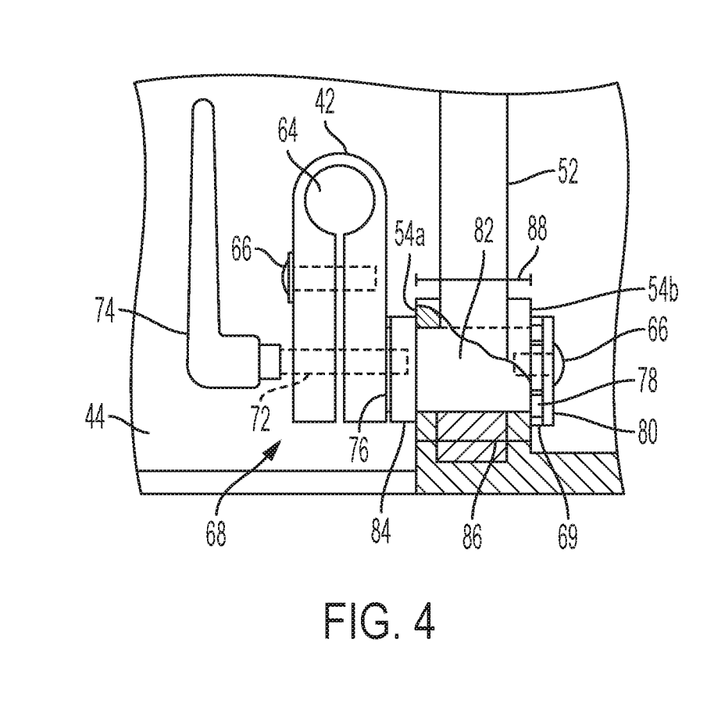
FIG. 4 is a partially sectioned detailed enlargement of a platform joint of a mobile desk, according to one embodiment.
Figure 5:
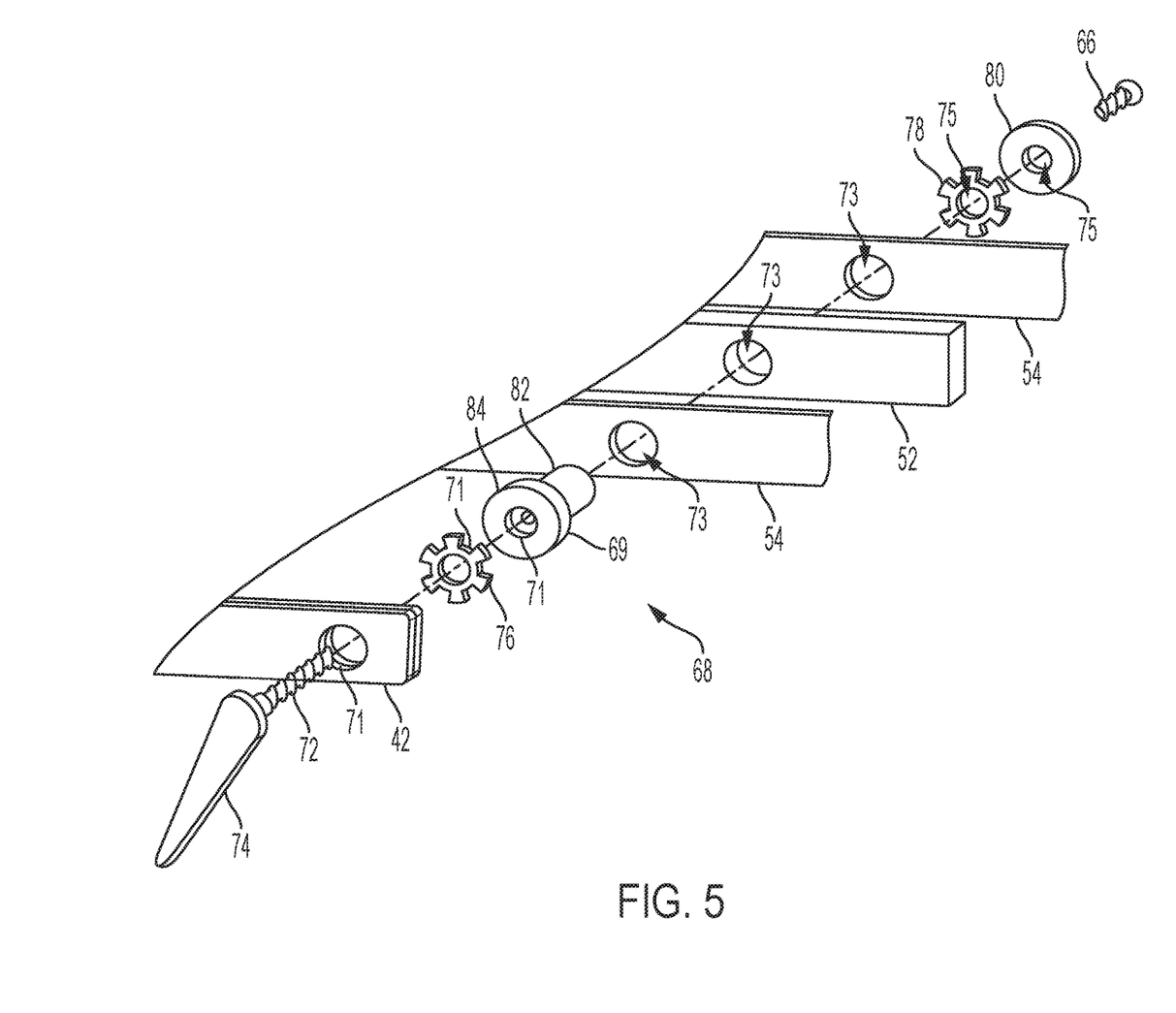
FIG. 5 is an exploded view of a platform joint of a mobile desk, according to one embodiment.

Platform 16 is coupled to support rods 14 through an adjustment system. The adjustment system permits platform 16 to be adjusted and fixed on support rods 14. As shown in FIGS. 4 and 5, the adjustment system includes a mounting piece 42, a platform joint 68, and an angle adjustment handle 74. Mounting piece 42 engages with support rod 14. Stabilizer bar 52 is coupled to mounted piece 42 through joint 68. The inclined position of platform 16 relative to carrier 12 can be adjusted by rotating handle 74, as shown in FIGS. 6 and 7. More particularly, handle 74 can rotate within joint 68 to control the rotational position of stabilizer bar 52.

FIGS. 4 and 5 provide the details of mounting piece 42 and joint 16. As stated above, mounting piece 42 can be tightened to firmly grip support rod 14 such that platform 16 is securely supported thereon. Mounting piece 42 comprises an aperture or an orifice 64 structured to receive platform mounting section 36 of a corresponding support rod 14. Mounting piece 42 can be tightened to firmly grip support rod 14 such that platform 16 is securely supported thereon. In the embodiment shown in FIG. 4, mounting piece 42 may include a screw 66 for tightening orifice 64 around platform mounting section 36. In other embodiments, mounting piece 42 might securely engage support rod 14 by any other suitable means.

Joint 68 is formed when mounting piece 42 couples to stabilizer bar 52. Joint components includes mounting piece 42, stabilizer bar 52, and projections 54. All joint components may be placed next to each other and each include an aperture structured to receive an axis rod 72, a cylindrical fitting 69, or a screw 66 for coupling together the components of joint 68. In one embodiment shown in FIG. 4, one stabilizer bar 52 is placed between two projections 54. Mounting piece 42 is placed next to a first side of projection 54a facing toward handle 74. A second side of projection 54b faces opposite to handle 74. Axis rod 72 may be, for example, a screw, a bolt, a pin, or the like. Joint 68 enables platform 16 to pivot relative to carrier 12 around an axis defined by axis rods 72. Referring to FIGS. 6 and 7, platform 16 may be adjusted between the horizontal orientation and the inclined orientation. Preferably, when platform 16 is at a fixed position, the tip of handle will touch the bottom side 44 of platform 16 to provide support.

To achieve the purpose of rotation, handle 74 is connected to axis rod 72 to allow the user to adjust the rotation angle. Additionally, at least one lateral star washers 76, 78 and cylindrical fitting 69 are applied at joint 68. According to the embodiment in FIGS. 4 and 5, mounting piece 42, a first star washer 76, and a first side of cylindrical fitting 69 include a first aperture 71 structured to receive axis rod 72 such that axis rod 72 can extend through mounting piece 42 and first star washer 76 to cylindrical fitting 69. First aperture 71 of cylindrical fitting 69 may also be threaded such that axis rod 72 can be screwed into first aperture 71. Accordingly, joint 68 is capable of being tightened or loosened by way of handle 74 to which axis rod 72 is attached. When handle 74 is in a substantially vertical position, it may support the back portion of platform 16.

Cylindrical fitting 69 may have a substantially cylindrical body 82 with a substantially cylindrical lip 84 extending around a perimeter of body 82 such that cylindrical fitting 69 may have a T-shape if viewed from the side, such as in the partially sectioned view of FIG. 4. According to FIG. 4, stabilizer bar 52 and projections 54 may include a second aperture 73 structured to receive body 82, with body 82 extending from first side of projections 54a, to second side of projections 54b. Put another way, a width 86 of body 82 may be substantially similar to a combined width 88 of stabilizer bar 52 and projections 54a and 54b. Lip 84 is structured to rest upon the lateral surface of projection 54a, with lip 84 including first aperture 71 formed therein, and body including a third aperture 75, shown in FIG. 5, formed therein that can be structured to receive screw 66. In another embodiment, lip 84 may receive third aperture 75, and body 82 receives first aperture 71. In another embodiment, the aperture may penetrate lip 84 into body 82, and a fixing mechanism is applied on the end opposite to lip 82 to hold projection 54 and stabilizer bar 52. The key of cylindrical fitting 69 is to provide apertures from one ends and stabilize projection 54 and stabilizer bar 52 on the other end so that when one side of screw rotates, the components can rotated within the freedom provided by cylindrical fitting 69 on the other end. Joint 68 may further include a second, medial star washer 78, screw 66, and one or more flat washers 80 positioned within joint 68 on an opposite side of stabilizer bar 52 than handle 74, axis rod 72, mounting piece 42, and first star washer 76. Star washers 76, 78 may engage abutting surfaces when joint 68 is tightened to fix an angle of platform 16 relative to carrier 12. In some embodiments, joint 68 may include more or fewer star washers, or might include a different mechanism for fixing the angle of platform 16. Joint 68 may also include one or more flat washers 80, such as a standard washer or a fender washer.

To assist in balancing platform 16, each support rod 14 is positioned within joint 68 outboard of the corresponding stabilizer bar 52, and forward of a corresponding axis rod 72.

This structure may provide a counterweight to loads placed upon platform 16. In other embodiments, to achieve the purpose of balancing, mobile desk 10 could have a platform 16 that is weighted near back side 58. Further, the positioning of platform 16 upon platform mounting section 36 of support rods 14 may provide additional advantages as compared with strategies in which loads are attached to support rods 14 in a different way. By way of example, attaching or hanging a load or a load-bearing structure to support rods 14 (rather than upon platform mounting section 36), may pull carrier 12 forward and may undesirably shift the center of gravity of mobile desk 10. Further, the axis of inclination of platform 16 defined by axis rods 72 may be oriented about 90 degrees relative to axes of rotation defined by each platform mounting section 36. The relative orientation of these axes may prevent undesirable horizontal movement of platform 16 while mobile desk 10 is in use, among other things. Additional features of the present disclosure that advantageously impact the stability of mobile desk 10 will be apparent from the discussion herein.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. It will be appreciated that certain features and/or properties of the present disclosure, such as relative dimensions or angles, may not be shown to scale. As noted above, the teachings set forth herein are applicable to a variety of different devices and assemblies having a variety of different structures than those specifically described herein. Other aspects, features, and advantages will be apparent upon an examination of the attached drawings and appended claims. As used herein, the articles "a" and "an" are intended to include one or more items, and may be used interchangeably with "at least one." Where only one item is intended, the term "one" or similar language is used. Also, as used herein, the terms "has," "have," "having," or the like are intended to be open-ended terms.

What is claimed is:

1. A mobile desk, comprising:
    a carrier configured to fit upon an upper body of a user, the carrier including
        a shoulder harness,
        a torso support member, and
        a vertical connector body coupling the shoulder harness with torso support member, the torso support member being curved between a right side and a left side of torso support member;
    at least one support rod coupling to the carrier;
    a platform having a bottom side, the at least one support rod supporting the platform from the bottom side; and
    a pivot joint between the at least one support rod and the platform to allow the platform to rotate about an axis of rotation relative to the support rod.

2. The mobile desk of claim 1 wherein the support rod is hook-shaped and includes a carrier mounting section adjustably connected to the carrier; and a platform mounting section, and the platform mounting section supports the platform from the bottom side.

3. The mobile desk of claim 1 wherein the joint including a handle for adjusting the rotation of the platform.

4. The mobile desk of claim 1 wherein the joint further includes an angle adjustment handle.

5. The mobile desk of claim 1, wherein the least one support rod includes a first support rod and a second support rod.

6. The mobile desk of claim 5 wherein the first support rod and the second support rod have a hook shape.

7. A mobile desk, comprising:
    a body supported carrier assembly including
        a shoulder harness,
        a torso support member, and
        a vertical connector body coupling the carrier assembly with torso support member;
    a platform having
        a bottom side,
        a substantially planar top side,
        a substantially straight stabilizer bar coupled with the bottom side, and
        a mount piece coupled with the stabilizer bar to form a joint; and
    a hook-shaped support rod coupling the carrier assembly with the platform, the support rod being partially received by the mount piece; and the joint having a pivoted member to allow the platform to be adjusted between a horizontal position and an inclined position.

8. The mobile desk of claim 7 wherein the joint further includes a cylindrical fitting having a body and a lip.

9. The mobile desk of claim 8 wherein the joint further includes a projection from the bottom side of the platform on each side of the stabilizer bar, the body having a width substantially similar to a combined width of the stabilizer bar and the two projections.

10. The mobile desk of claim 7 wherein the joint further includes a star washer.

11. A mobile desk, comprising:
    a carrier configured to fit upon an upper body of a user;
    at least one support rod coupling to the carrier, the least one support rod including a first support rod and a second support rod;
    a platform having a bottom side, the at least one support rod supporting the platform from the bottom side; and
    a pivot joint between the at least one support rod and the platform to allow the platform to rotate about an axis of rotation relative to the support rod.

12. The mobile desk of claim 11 wherein the first support rod and the second support rod have a hook shape.

* * * * *